US012115832B2

(12) United States Patent
Vandamme

(10) Patent No.: US 12,115,832 B2
(45) Date of Patent: Oct. 15, 2024

(54) SYSTEMS FOR CONDUCTING AIR BETWEEN THE WHEEL WELLS OF AN ELECTRIFIED VEHICLE

(71) Applicant: Dana Automotive Systems Group, LLC, Maumee, OH (US)

(72) Inventor: Dolf Vandamme, Roeselare (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 43 days.

(21) Appl. No.: 17/444,231

(22) Filed: Aug. 2, 2021

(65) Prior Publication Data

US 2023/0032949 A1    Feb. 2, 2023

(51) Int. Cl.

| B60H 1/00 | (2006.01) |
|---|---|
| B60K 1/00 | (2006.01) |
| B60K 1/04 | (2019.01) |
| B60K 11/00 | (2006.01) |
| B60K 11/02 | (2006.01) |
| B60K 11/04 | (2006.01) |
| B60K 11/06 | (2006.01) |
| B60K 11/08 | (2006.01) |

(52) U.S. Cl.
CPC ..... *B60H 1/00278* (2013.01); *B60H 1/00028* (2013.01); *B60H 1/00385* (2013.01); *B60K 11/06* (2013.01); *B60K 11/08* (2013.01); *B60H 2001/00085* (2013.01); *B60H 2001/00107* (2013.01); *B60H 2001/00121* (2013.01); *B60H 2001/003* (2013.01); *B60K 1/00* (2013.01); *B60K 2001/005* (2013.01); *B60K 2001/006* (2013.01); *B60K 1/04* (2013.01); *B60K 2001/0438* (2013.01); *B60K 11/00* (2013.01); *B60K 11/02* (2013.01); *B60K 11/04* (2013.01); *B60Y 2200/14* (2013.01); *Y02T 10/70* (2013.01)

(58) Field of Classification Search
CPC ............ B60H 1/00278; B60H 1/00028; B60H 1/00385; B60H 2001/00085; B60H 2001/00107; B60H 2001/00121; B60H 2001/003; B60K 11/06; B60K 11/08; B60K 1/00; B60K 1/04; B60K 11/00; B60K 11/02; B60K 11/04; B60K 2001/005; B60K 2001/006; B60K 2001/0438; B60Y 2200/14; Y02T 10/70
See application file for complete search history.

(56) References Cited

U.S. PATENT DOCUMENTS

| 2,115,124 | A | * | 4/1938 | Schittke | .................... | F01P 5/04 |
|---|---|---|---|---|---|---|
| | | | | | | 165/41 |
| 2,247,742 | A | * | 7/1941 | Best | ...................... | B60K 11/04 |
| | | | | | | 180/68.1 |
| 2,511,549 | A | * | 6/1950 | Simi | ........................ | F01P 5/04 |
| | | | | | | 454/157 |

(Continued)

FOREIGN PATENT DOCUMENTS

| CN | 108569133 | A | * | 9/2018 | ............... | B60K 1/04 |
|---|---|---|---|---|---|---|
| CN | 108569133 | B | * | 9/2021 | ............... | B60K 1/04 |

(Continued)

*Primary Examiner* — Ljiljana V. Ciric
(74) *Attorney, Agent, or Firm* — McCoy Russell LLP

(57) ABSTRACT

Systems for a vehicle air duct including a passage, the passage including an inlet at a downstream portion of a front wheel well of the vehicle and an outlet upstream of a rear wheel well of the vehicle.

8 Claims, 5 Drawing Sheets

(56) References Cited

U.S. PATENT DOCUMENTS

| | | | | |
|---|---|---|---|---|
| 3,672,048 | A | * | 6/1972 | Conwell .................. F01K 15/02 122/3 |
| 3,933,136 | A | * | 1/1976 | Burst ...................... E02F 3/968 123/41.58 |
| 4,709,855 | A | * | 12/1987 | Brenner ............. B60H 1/00207 237/12.3 A |
| 4,805,747 | A | * | 2/1989 | Moedinger ............... B60T 5/00 188/71.6 |
| 5,046,550 | A | * | 9/1991 | Boll ....................... B60K 11/04 123/41.31 |
| 5,209,285 | A | * | 5/1993 | Joshi ...................... B60K 11/04 165/44 |
| 5,476,138 | A | * | 12/1995 | Iwasaki ................. F28D 1/0435 165/41 |
| 5,526,872 | A | * | 6/1996 | Gielda ................... B60K 11/02 296/180.1 |
| 5,816,350 | A | * | 10/1998 | Akira .................... E02F 9/0891 180/68.1 |
| 6,298,906 | B1 | * | 10/2001 | Vize ........................ F28F 9/002 165/41 |
| 7,290,630 | B2 | * | 11/2007 | Maeda .................... F28F 1/128 180/69.2 |
| 8,474,557 | B2 | * | 7/2013 | Wolf ........................ B60T 5/00 180/68.1 |
| 8,544,583 | B2 | * | 10/2013 | Ajisaka .................. B62D 35/02 180/68.1 |
| 8,672,067 | B2 | | 3/2014 | Ajisaka |
| 8,689,925 | B2 | * | 4/2014 | Ajisaka .................. B60K 13/04 180/68.2 |
| 8,752,660 | B2 | | 6/2014 | Ajisaka |
| 8,794,363 | B2 | | 8/2014 | Wolf |
| 8,936,121 | B2 | * | 1/2015 | Vacca .................... B60K 11/04 165/44 |
| 8,955,628 | B2 | * | 2/2015 | Murray .................. B60K 11/04 180/68.1 |
| 9,188,052 | B2 | * | 11/2015 | Tajima ...................... F01P 5/06 |
| 9,487,251 | B2 | | 11/2016 | Gibson et al. |
| 11,143,089 | B2 | * | 10/2021 | Wolf ...................... B60K 11/04 |
| 11,326,506 | B2 | * | 5/2022 | Cremering ............... F01P 11/10 |
| 11,498,435 | B2 | * | 11/2022 | Hebert ..................... B60K 1/04 |
| 11,725,569 | B1 | * | 8/2023 | Abeysinghe ............ F01P 11/10 123/42 |
| 11,752,830 | B1 | * | 9/2023 | Morris ............... B60H 1/00278 165/44 |
| 2002/0164944 | A1 | * | 11/2002 | Haglid .................. F28D 19/041 454/228 |
| 2003/0121638 | A1 | * | 7/2003 | Molari .................. B62D 25/082 165/41 |
| 2003/0201133 | A1 | * | 10/2003 | Kobayashi ........... B62D 25/081 180/291 |
| 2012/0024611 | A1 | * | 2/2012 | Ajisaka .................... B60K 11/08 180/68.1 |
| 2012/0255799 | A1 | * | 10/2012 | Kohler .................... B60L 58/20 180/65.245 |
| 2013/0316634 | A1 | * | 11/2013 | Ajisaka .................. B60K 11/04 454/152 |
| 2014/0138077 | A1 | * | 5/2014 | Ajisaka .................. B60K 11/04 165/41 |
| 2018/0086394 | A1 | | 5/2018 | Dunford et al. |
| 2018/0339583 | A1 | * | 11/2018 | Hirai ...................... H02K 5/203 |
| 2022/0379740 | A1 | * | 12/2022 | Hebert ................... B60K 17/22 |

FOREIGN PATENT DOCUMENTS

| | | | | |
|---|---|---|---|---|
| CN | 114056075 | A | * | 2/2022 ............. B60L 50/64 |
| CN | 110614913 | B | * | 9/2022 ............. B60K 11/04 |
| DE | 102018114499 | A1 | * | 12/2019 ............. B60K 11/04 |
| DE | 102020117530 | A1 | * | 1/2021 ............. B60K 11/00 |
| DE | 102018114499 | B4 | * | 2/2021 ............. B60K 11/04 |
| DE | 102021117804 | A1 | * | 1/2022 |
| DE | 102013216397 | B4 | * | 2/2022 ............. B60L 58/26 |
| DE | 102021118950 | A1 | * | 2/2022 ............. B60L 50/64 |
| DE | 102021106205 | A1 | * | 9/2022 |
| DE | 102013210730 | B4 | * | 10/2022 ............. B60K 1/00 |
| EP | 2781390 | A1 | * | 9/2014 ............. B60H 1/3407 |
| EP | 3616950 | A1 | * | 3/2020 ............. B60H 1/3227 |
| FR | 3115731 | A1 | * | 5/2022 |
| FR | 3116301 | A1 | * | 5/2022 |
| FR | 3119569 | A1 | * | 8/2022 ......... B60H 1/00564 |
| GB | 2607059 | A | * | 11/2022 ............. B60K 11/04 |
| JP | 2011102068 | A | * | 5/2011 |
| JP | 2011240827 | A | * | 12/2011 |
| JP | 2013107469 | A | * | 6/2013 |
| JP | 5533640 | B2 | | 6/2014 |
| JP | 6528844 | B2 | * | 6/2019 ......... B60H 1/00207 |
| JP | 2021014162 | A | * | 2/2021 |
| JP | 2021160566 | A | * | 10/2021 ........... H01M 10/613 |
| JP | 2022023445 | A | * | 2/2022 ......... B60H 1/00278 |
| KR | 20200063396 | A | * | 6/2020 |
| KR | 102382679 | B1 | * | 4/2022 |
| WO | 2007119270 | A1 | | 10/2007 |
| WO | WO-2011151917 | A1 | * | 12/2011 ............. B60K 11/08 |
| WO | WO-2012101795 | A1 | * | 8/2012 ............... B60K 1/04 |
| WO | WO-2013073262 | A1 | * | 5/2013 ............ B60H 1/3407 |
| WO | WO-2022096203 | A1 | * | 5/2022 |
| WO | WO-2022106147 | A1 | * | 5/2022 |
| WO | WO-2022200168 | A1 | * | 9/2022 |

* cited by examiner

SYSTEMS FOR CONDUCTING AIR BETWEEN THE WHEEL WELLS OF AN ELECTRIFIED VEHICLE

TECHNICAL FIELD

The present description relates generally to methods and systems for an electrified vehicle.

BACKGROUND AND SUMMARY

Electric and partially electric vehicles may demand cooling to one or more components. Cooling systems may be convoluted due to coolant demand from multiple components. Some cooling systems may utilize liquid coolant, which may require pumps, increasing power consumption and packaging size. In some examples, it may be desired to supplement liquid cooling or reduce a packaging size of the liquid coolant system by utilizing ambient air, such as ram air.

Vehicles with internal combustion engines may be limited in a number of locations in which ambient air may be drawn due to air temperatures being too high due to heat dissipated from the internal combustion engine. Previous examples of air ducts configured to cool vehicle components may receive ram air from a front end of a vehicle. This may increase a packaging size of the air cooling system for components arranged along a mid-ship of an all-electric or partially electric vehicle, such components may include an electric motor, a battery pack, and driving components. Thus, some configurations of electric vehicles, such as electric vehicles with a skateboard chassis where the battery, the electric motor, and the driving components are integrally arranged in the chassis, may desire differently shaped air ducts that draw air closer to the vehicle mid-ship.

In one example, the issues described above may be addressed by a system for a vehicle including a passage comprising an inlet at a downstream portion of a front wheel well of the vehicle and an outlet upstream of a rear wheel well of the vehicle. In one example, the vehicle is an all-electric vehicle.

For example, the passage may receive ambient air at the inlet and flow ambient air along a lower lateral side rail of the vehicle toward the outlet. The outlet may expel ambient air upstream of the rear wheel well in a direction normal to a direction of forward vehicle travel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-5C are shown approximately to scale. However, other dimensions may be used.

DETAILED DESCRIPTION

Figure 1:
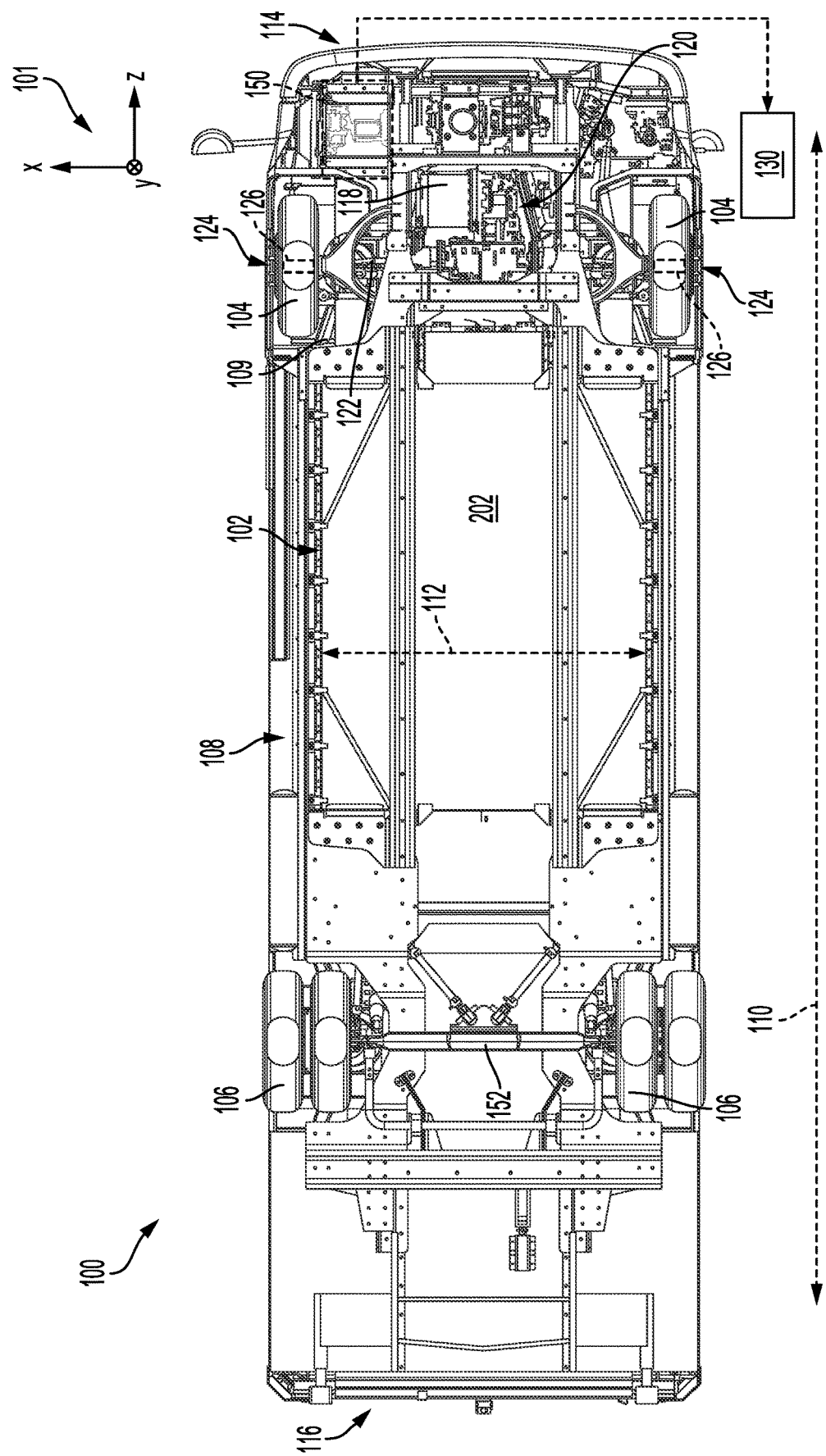
FIG. 1 shows an example of a vehicle incorporating a battery pack extending along a chassis of the vehicle from a bottom view.
Figure 2:
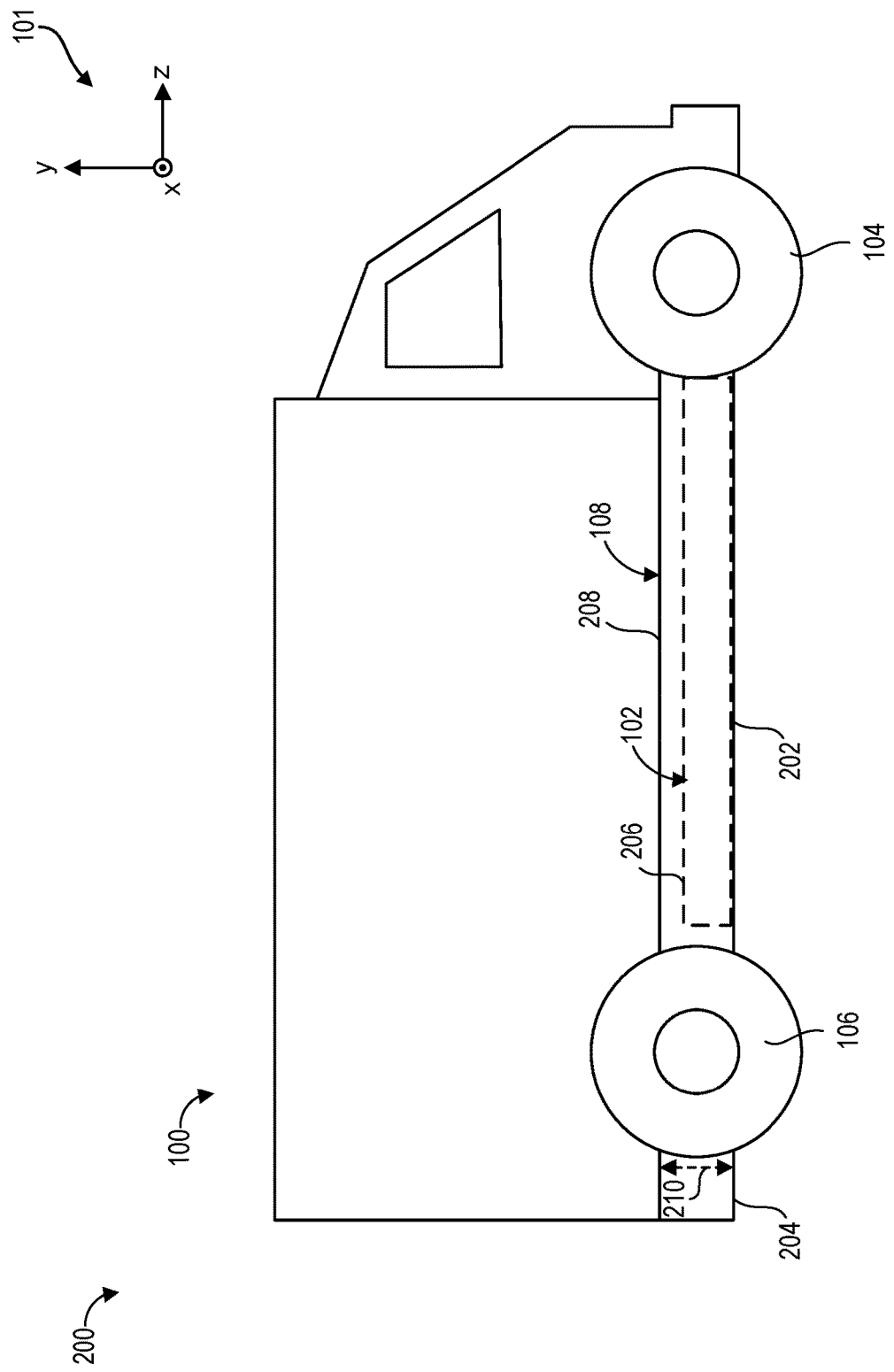
FIG. 2 shows the vehicle incorporating the battery pack from a profile view.
Figure 3:
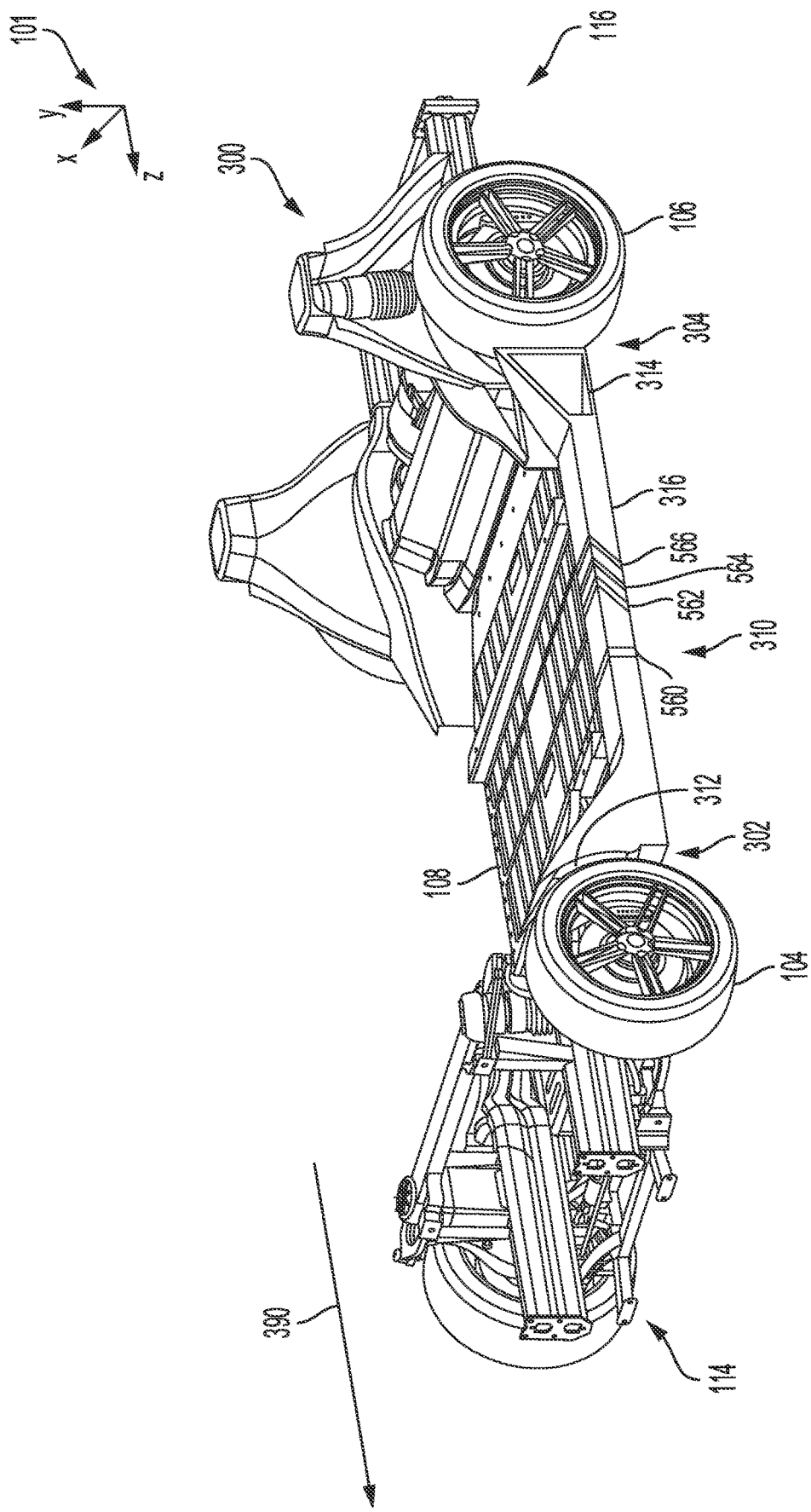
FIG. 3 shows a perspective view of the chassis including an air duct.

The following description relates to systems and methods for an electrified heavy-duty vehicle. In order to be electrically propelled, an electrical system of the vehicle may be adapted with a battery pack arranged along a chassis of the vehicle, as shown in FIG. 1. In one example, the vehicle may be configured with a skateboard chassis where the battery is integrated into the skateboard chassis, as illustrated in FIG. 2. FIGS. 3-5C illustrate various views of an air duct extending along a side rail of a vehicle.

FIGS. 1-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a heavy-duty vehicle 100 may have an electrical system configured with a battery pack 102 as a prime mover providing electrical energy for propulsion. A set of reference axes 101 are provided for comparison between views shown, indicating a y-axis, an x-axis, and a z-axis. In one example, the y-axis may be parallel with a direction of gravity and a vertical direction, the x-axis parallel with a horizontal direction, and the z-axis parallel with transverse direction and a longitudinal axis of the vehicle 100, e.g., parallel with a length of the vehicle 100. The heavy-duty vehicle 100 may be a variety of vehicle types, including light commercial vehicles, buses of different sizes, medium- and heavy-duty trucks, vocational vehicles, etc. The battery pack 102 may be an energy storage device configured to deliver electrical power to various components of the electrical system of the vehicle 100 including supplying current to motors coupled to front wheels 104 and/or rear wheels 106 of the vehicle 100. The battery pack 102 may extend along a chassis 108 of the vehicle 100, between the front wheels 104 and the rear wheels 106, along a portion of a length 110 of the vehicle 100. A width 112 of the battery pack 102 may be similar to a distance between innermost wheels of the rear wheels 106.

In one example, the chassis 108 of the vehicle 100 may be a skateboard chassis 108 in which the battery pack 102 is integrated, e.g., forming a continuous unit with the skateboard chassis 108. The skateboard chassis 108 may extend along a greater portion of the length 110 of the vehicle 100 than the battery pack 102, from a point behind the front wheels 104 to a rear end 116 of the vehicle. However, in other examples, the skateboard chassis 108 may vary in length, e.g., the skateboard chassis 108 may be shorter than depicted in FIG. 1. In one example, as shown in a profile view 200 of the vehicle 100 in FIG. 2, the skateboard chassis 108 may be a platform forming a floor of the vehicle 100. The skateboard chassis 108 may be formed of a solid, durable, strong material, such as aluminum, steel, fiber-reinforced materials, and/or other composite materials, able to withstand and support large loads (e.g., a maximum load for which the vehicle 100 is designed to carry under predetermined use cases or conditions).

The battery pack 102 may be embedded in the skateboard chassis 108, e.g., enclosed in a recess in the skateboard chassis 108, to form a single integrated structure, and may therefore also be incorporated into the floor of the vehicle 100. A bottom face 202 of the battery pack 102 may form a portion of a bottom surface 204 of the skateboard chassis 108. The battery pack 102 may therefore be biased within the skateboard chassis 108 at a lower region, with respect to the y-axis, of the skateboard chassis 108. However, in other examples, the battery pack 102 may instead be biased at an upper region of the skateboard chassis 108 with an upper face 206 of the battery pack 102 forming a portion of an upper surface 208 of the skateboard chassis 108. In yet other examples, the battery pack 102 may extend along a majority of a height 210 of the skateboard chassis 108.

The skateboard chassis 108 may provide various benefits with respect to efficient assembly and packaging of the vehicle 100. For example, the skateboard chassis 108 may be readily scalable, allowing different types of vehicle bodies to be attached. Depending on a height of a payload of the vehicle 100, a low vertical (e.g., with respect to the y-axis) positioning of the battery pack 102 in the vehicle 100 may provide even and balanced weight distribution without adversely affecting, or even positively contributing to, a balance of the vehicle 100. Furthermore, locating the battery pack 102 in the vehicle floor may increase cabin space while enclosing the battery pack 102 in a durable, rigid structure that supports and shields the battery pack 102 from contact with debris, moving vehicle components, etc.

Returning to FIG. 1, a positioning of the battery pack 102 in the vehicle 100 may result in locating electrical components, such as electric motors, in a region between a front end 114 of the vehicle 100 and a front edge 109 of the skateboard chassis 108. Thus, packaging space is available between the front wheels 104, allowing implementation of a powertrain and a drive train at the front wheels 104 but not at the rear wheels 106 when the vehicle 100 is adapted with the skateboard chassis 108.

In addition, the battery pack 102 itself may be a strong, rigid structure and incorporating the battery pack 102 into the skateboard chassis 108 may further increase an overall stiffness, torsional resistance, and bending resistance of the skateboard chassis 108. By positioning the battery pack 102 at the bottom region of the skateboard chassis 108, the battery pack may be easily accessible for maintenance and/or replacement. As such, the battery pack 102 may be removably coupled to the skateboard chassis 108 and configured as a frame integrated independent sub-structure in the skateboard chassis 108. In other words, the battery pack 102 has a stand-alone structure that is embedded into the skateboard chassis 108 but readily accessible and may be removed when desired.

As described above, by adapting the vehicle with the skateboard chassis and integrated battery pack, additional components of the vehicle's electrical system, such as electric motors, may be positioned around the skateboard chassis, along a similar horizontal plane as the skateboard chassis. For example, an electric motor and a drive train may be arranged in front of the skateboard chassis, e.g., between the front end 114 of the vehicle 100 and a front edge 109 of the skateboard chassis 108 of FIG. 1, and between the front wheels 104. As such, the vehicle may be configured with front-wheel drive, as shown in FIG. 1. The vehicle 100 includes a motor 118 arranged proximate to the front end 114 of the vehicle 100, between the front wheels 104, the motor 118 configured to receive electrical power from the battery pack 102. In one example, the motor 118 may be a motor/generator, able to convert mechanical energy to electrical energy to recharge the battery pack 102. The motor 118 may be coupled to a drive train 120 which, in turn, is coupled to drive shafts 122 of the front wheels 104. The drive train 120 may include components such as a transmission and a differential. A torque converter may be located between the motor 118 and the transmission if the transmission is automatic, or a clutch may be arranged between the motor 118 and the transmission if the transmission is manual or single-gear direct drive. Thus, electrical power drawn from the battery pack 102 by the motor 118 may be converted to torque to drive rotation of the front wheels 104 via the drive train 120. The rear wheels 106 may be trailer wheels rotated together on a single axle 152.

Implementing regenerative braking in the vehicle 100 may increase an efficiency and appeal of the vehicle 100 by allowing energy that may otherwise be lost as waste heat to be at least partially recuperated. The recovered energy may be used to replenish battery charge with the motor 118 operating as a generator in such instances. However, conventional front wheel hub assemblies 124 compatible with motorized front wheels 104, such as front wheel hub assemblies used in heavy-duty vehicles configured with four-wheel drive, may not be suitable for regenerative braking due to an automatic locking mechanism of the conventional front wheel hub assemblies. The use of front wheel hub assemblies with automatic locking mechanisms may disrupt regenerative braking. For example, the automatic locking mechanism of a given front wheel hub assembly may correspond to a ratchet mechanism. Specifically, the automatic locking mechanism may allow a corresponding front wheel 104 to rotate freely about its drive shaft 122 when no torque is applied, impeding regenerative braking by allowing free rotation of the front wheel 104 absent applied acceleration torque (which in turn may not brake the vehicle 100). Instead, regenerative braking is typically made possible via a rigid connection between the drive shafts and the wheels, such that when deceleration (braking) torque is applied, the wheels will not rotate freely and kinetic energy of the vehicle 100 may be converted back to electrical energy. As an alternative, customized front wheel hub assemblies adapted for regenerative braking may be manufactured. However, such customized front wheel hub assemblies may be undesirable due to a high cost of production.

One approach to address the issue described above includes replacing the automatic locking mechanism of the conventional front wheel hub assemblies 124 with a drive shaft adapter 126, as indicated in FIG. 1, that enables regenerative braking to occur at the vehicle front wheels 104. As such, the conventional front wheel hub assemblies may be used, e.g., as used for four-wheel drive applications, circumventing additional costs arising from development of customized components, and adapted to assist in converting kinetic energy of the vehicle into energy stored at the battery pack 102. The drive shaft adapter 126 may be directly coupled to each of the front wheel hub assemblies 124, in contact with the drive shafts 122 of the front wheels 104.

The front wheel hub assembly 124 may extend through a central region of one of the front wheels 104 such that at least a portion of the front wheel hub assembly 124 is circumferentially surrounded by the front wheel 104. The front wheel hub assembly 124 may be formed of a durable, rigid material, such as steel or aluminum.

As described above, implementation of a drive shaft adapter may accommodate a front-wheel drive configuration of an electrified heavy-duty vehicle adapted with a skateboard chassis with an integrated battery pack. Packaging constraints imposed by the skateboard chassis may also demand rearrangement of power electronics of various vehicle electrical sub-systems such as a hydraulic pump, an air pump, an air conditioning (A/C) compressor, a water pump, controllers, junction boxes, fuses, a battery charger, inverters, etc., due to a vertically low positioning of the skateboard chassis. The sub-systems are included in an electrical system of the vehicle, drawing power from the battery pack. For example, as illustrated in FIG. 1, incorporation of the battery pack 102 into the skateboard chassis 108 may demand positioning sub-systems power electronics in a region between the front edge 109 of the skateboard chassis 108 and the front end 114 of the vehicle 100 where various other vehicle components already occupy at least a portion of the available packaging space. Positioning the power electronics of each of the sub-systems wherever each sub-system may be accommodated may result in use of long connectors, wires, and electrical cables which may be directly coupled to a frame of the vehicle 100 to maintain the connectors, wires, and cables off the ground. The connectors, wires, and cables may become easily tangled, degraded, and/or disconnected or come into contact with moving components of the vehicle 100. In addition, a scattered arrangement of the sub-systems may complicate access to components of the sub-systems when maintenance and repair is demanded.

Furthermore, during assembly, individual coupling of the sub-systems to the vehicle frame may be time consuming and include complex routing and tethering of connectors, wires, and cables. Sub-system components, such as pumps, may demand installation of rubber mounts to dampen transmission of vibrations to the vehicle chassis, which increases a number of parts to be attached to the vehicle and further adds to assembly time. In addition, individual coupling of the sub-systems may result in the sub-systems having an undesirably large footprint.

An overall footprint of the sub-systems power electronics may be reduced by mounting the power electronics on a single cradle. The cradle may be a supporting structure onto which the power electronics may be attached, thus consolidating the power electronics into a single unit. The power electronics may be assembled in the cradle prior to coupling to the vehicle. Electrical cables, vibrating components such as pumps, etc., may be secured to the cradle rather than individually attached to the vehicle frame and the cradle, supporting sub-systems relying on power from the battery pack, may be mounted to the vehicle frame in a position that allows convenient electrical coupling of the sub-systems to the battery pack. In some examples, the power electronics may be attached to the cradle without rubber supports. Instead, the cradle may be mounted to the vehicle chassis on rubber supports to reduce transmission of vibrations to the vehicle from the sub-systems power electronics as a single unit, thereby decreasing an amount of rubber supports for suppressing propagation of vibrations.

As described above, a cradle may provide consolidation of power electronics for various electrical sub-systems of a vehicle, thus decreasing an overall footprint of the sub-systems. The cradle may be positioned in an accessible location along the vehicle frame, around the skateboard chassis and proximate to the battery pack 102 to enable electrical coupling of the sub-systems to the battery pack 102 without use of undesirably long cables. For example, as shown in FIG. 1, a cradle 150 may be positioned along an underside of the vehicle 100, between the front end 114 and the skateboard chassis 108, along a driver's side of the vehicle 100. However, other examples may include the cradle 150 arranged in other locations along the vehicle frame, similarly between the front end 114 and the skateboard chassis 108 (such as on a passenger's side of the vehicle 100 or taking the place of an internal combustion engine, e.g., in front of the vehicle cabin). Accordingly, the cradle 150 may be placed for ease of access for maintenance thereof.

The power electronics mounted on the cradle 150 may include various sub-system controllers. The controllers may be communicatively coupled to a vehicle control unit 130, such as powertrain control module. The control unit 130 is a computing device, such as a microcomputer that includes a processor unit, a non-transitory computer-readable storage medium device, input/output ports, memory, and a data bus. Computer-readable storage medium included in the control unit 130 is programmable with computer readable data representing instructions executable by the processor for performing various control routines and methods. Operation of the various sub-systems supported on the cradle 150 may be controlled by the control unit 130, based on various sensors and actuators (not shown) included in the vehicle 100.

FIGS. 3 to 5C illustrate an example of a vehicle 300 including the skateboard chassis 108 of FIGS. 1 and 2. The vehicle 300 further includes a passage 310, shaped as an air duct, extending from a front wheel well 302 of a front wheel 104 to a rear wheel well 304 of a rear wheel 106 of FIG. 1. As such, components previously introduced may be similarly numbered these figures. FIGS. 3, 4, 5A, 5B, and 5C are described in tandem herein. In one example, the passage 310 may be arranged along only a driver side of the vehicle 300. Additionally or alternatively, the passage 310 may be arranged along the driver side and the passenger side of the vehicle 300. In one example, the vehicle 300 is an all-electric vehicle.

The front wheel well 302 is arranged proximally to the front wheel 104 of the front end 114 of the electric vehicle 300. The rear wheel well 304 is arranged proximally to the rear wheel 106 of the rear end 116 of the electric vehicle 300.

The passage 310 may extend from a rear portion of the front wheel well 302 to a front portion of the rear wheel well 304. More specifically, the passage 310 may include an inlet 312 fluidly coupled to air surrounding the front wheel 104 in the front wheel well 302. The inlet 312 may receive air through the downstream section of the front wheel well 302 in a direction opposite to a forward direction of vehicle travel (shown via arrow 390). Herein, the forward direction of vehicle travel is interchangeably referred to as the direction of forward vehicle travel.

The inlet 312 may span less than a 90-degree arc angle of the front wheel 104. The arc angle may correspond to a middle to upper region of the front wheel 104. That is to say, the inlet 312 may be closer to a portion of the front wheel 104 further away from a ground on which the electric vehicle 300 is driven.

Air may travel through the passage 310 along a side lateral portion of the electric vehicle 300. In one example, the passage 310 is arranged proximally to a lower side rail, below door panels of the electric vehicle 300. The passage 310 may extend from the front wheel well 302 toward the rear wheel well 304, wherein the passage 310 may include an outlet 314 adjacent to the rear wheel well 304.

The outlet 314 may be configured to expel air from the passage 310 in a direction normal to the forward direction of vehicle travel. Additionally or alternatively, the outlet 314 may expel air from the passage 310 in a direction normal to the direction of air travel through the inlet 312 and a mid-section 316 of the passage 310.

The mid-section 316 extends from the inlet 312 to the outlet 314. A shape of the mid-section 316 may deviate from a shape of each of the inlet 312 and the outlet 314. In one example, such as in the example illustrated in FIG. 4, the inlet 312 may include a fin shape, such as a shark fin shape. The outlet 314 may include a triangle shape. The mid-section 316 may include a rectangular shape.

Figure 5A:
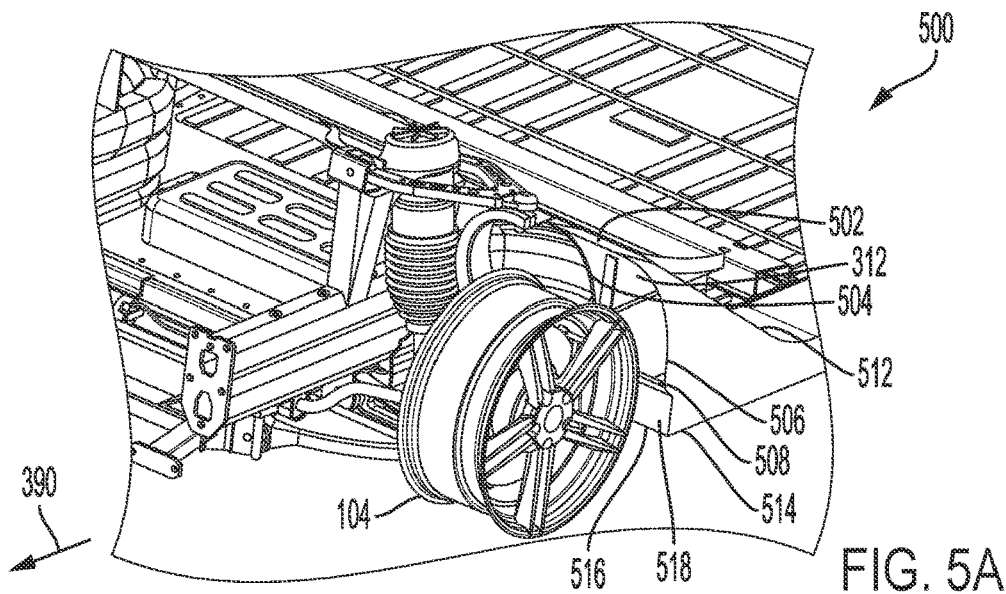
FIG. 5A shows a shape of an inlet of the air duct.

Turning to FIG. 5A, it shows a detailed view 500 of the inlet 312. The inlet 312 includes a fin shape, including a top edge 502, a first side edge 504, a second side edge 506, and a lower edge 508. A combination of the top edge 502, the first side edge 504, a second side edge 506, and the lower edge 508 may include a curved shape that tracks a curvature of the front wheel 104. The top edge 502 may be positioned more upstream than the lower edge 508, wherein the first side edge 504 and the second side edge 506 may curve from the top edge 502 to the lower edge 508.

An upper surface 512 may curve from the top edge 502 toward the mid-section 316. In one example, the upper surface 512 comprises a J-shape or other similarly contoured shape. A bottom surface 514, extends from a bottom edge 516 toward an outlet (e.g., outlet 314 of FIG. 3) of the passage 310. A wall 518 may be arranged between the lower edge 308 and the bottom edge 516, wherein the wall 518 blocks air from entering the passage 310. As such, air may only enter via the inlet 312.

Figure 4:
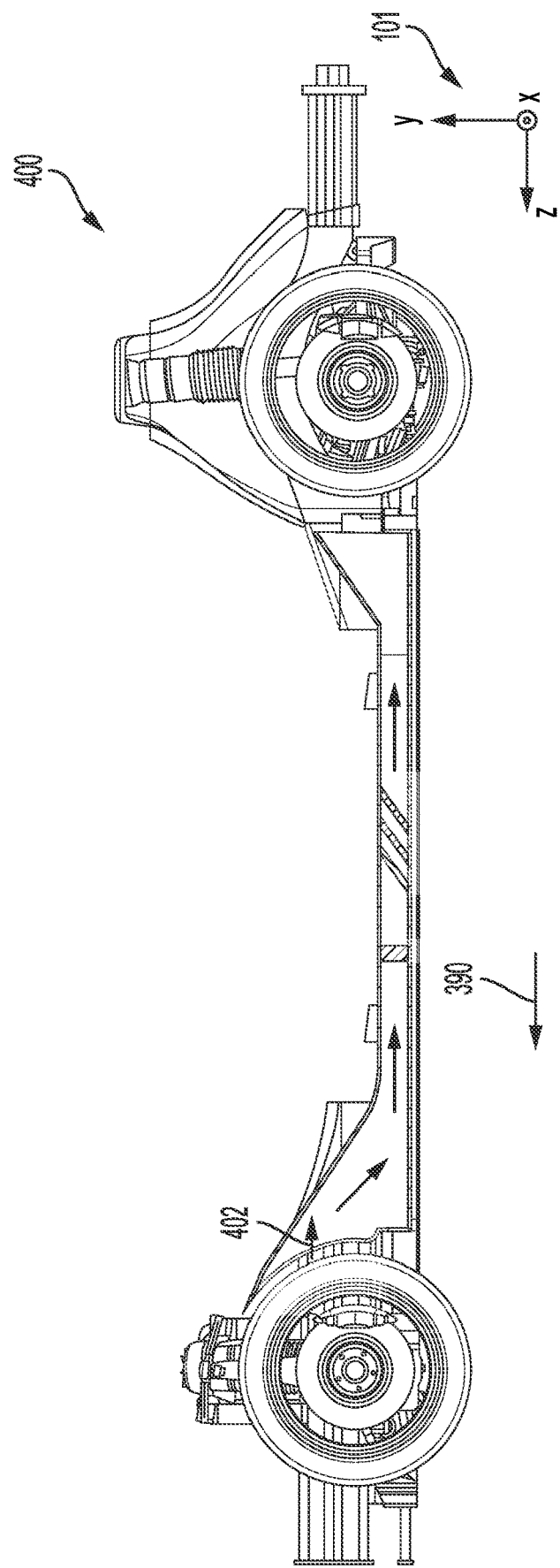
FIG. 4 shows a side-on view of the air duct including one or more components arranged therein.

As illustrated, the inlet 312 faces the direction of forward vehicle travel 390 and is configured to admit air into the passage 310 in a direction opposite the direction of forward vehicle travel. Air entering the inlet 312 may turn or deviate from an original flow direction before entering the mid-section 316 of the passage 310. An example of air flow through the passage 310 is illustrated in FIG. 4.

Figure 5B:
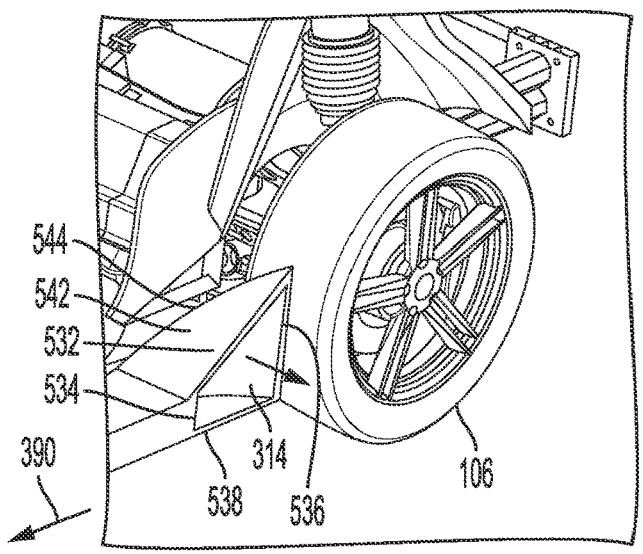
FIG. 5B shows a cross-sectional view of the air duct illustrating a fan positioned upstream of one or more components.

Turning to FIG. 5B, it shows a detailed view 525 of the outlet 314. The outlet 314 may include a top edge 532, an upstream edge 534, a downstream edge 536, and a bottom edge 538. A top surface 542 may comprise a triangular shape and extend from the mid-section 316 to an upstream edge of the rear wheel 106. The top surface 542 may be defined by the top edge 532 and a curved edge 544. The curved edge 544 may extend from an interior edge of the mid-section 316 away from the vehicle toward an intersection between the top edge 532 and the downstream edge 536. The top edge 532 may extend from a top surface of the mid-section 316 in an upward angle from a lower portion of the rear wheel 106 to an upper portion of the rear wheel 106.

The outlet 314, which may be defined by the top edge 532, the upstream edge 534, the downstream edge 536, and the bottom edge 538, may include a scalene quadrilateral shape. That is to say, none of the top edge 532, the upstream edge 534, the downstream edge 536, and the bottom edge 538 may be equal. The outlet 314 may face a direction normal to the forward direction of vehicle travel 390, away from each of the vehicle and the rear wheel 106.

Figure 5C:
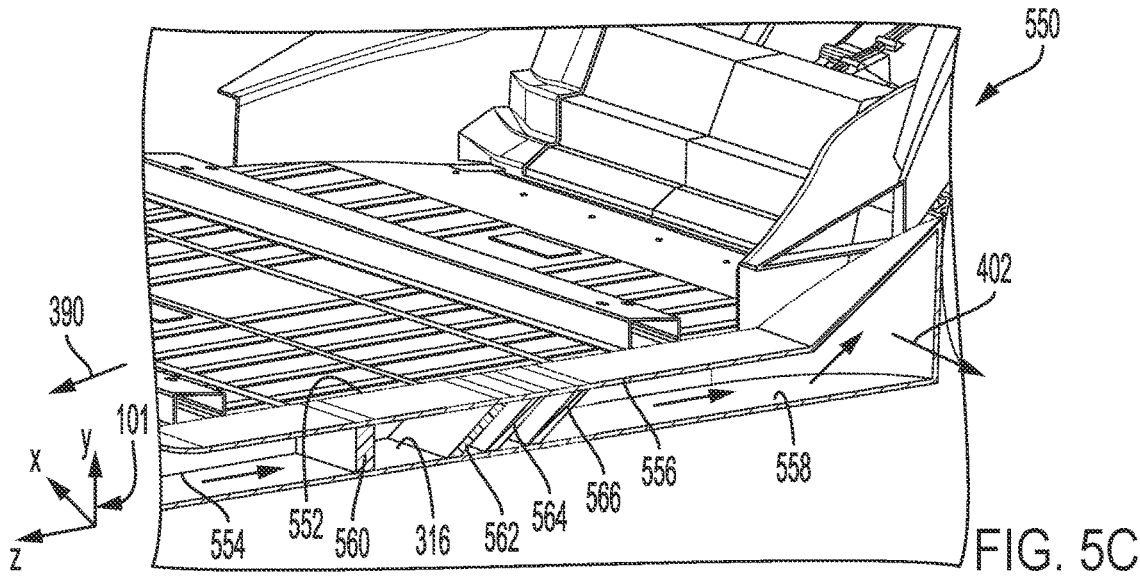
FIG. 5C shows a shape of an outlet of the air duct.

Turning now to FIG. 5C, it shows a detailed view 550 of the mid-section 316. The mid-section 316 may include a substantially uniform shape. In one example, the mid-section 316 includes a rectangular cross-sectional shape defined by an upper interior edge 552, a lower interior edge 554, an upper outer edge 556, and a lower outer edge 558. Each of the upper interior edge 552, the lower interior edge 554, the upper outer edge 556, and the lower outer edge 558 may be linear.

The mid-section 316 may include a smaller cross-sectional area than each of the inlet 312 and the outlet 314. The mid-section 316 may house one or more components. In the example of FIG. 5C, the mid-section 316 may house a fan 560 upstream of one or more heat exchangers of one or more components of the vehicle, relative to a direction of air flow through the passage 310.

The fan 560 may be arranged upstream of one or more of an air conditioning (AC) condenser 562, a battery radiator 564, and an electric motor radiator 566. The fan 560 may be configured to promote air flow through the passage 310 based on one or more conditions including but not limited to a coolant temperature of one or more of the AC condenser 562, the battery radiator 564, and the electric motor radiator 566, along with a temperature of ambient air adjacent to the inlet 312 of the front wheel well 104. In one example, the coolant temperature may be sensed via a coolant temperature arranged in each of the AC condenser 562, the battery radiator 564, and the electric motor radiator 566. An additional temperature sensor may be arranged adjacent to the inlet 312 and configured to sense a temperature of ambient air proximal to the front wheel well 302. Additionally or alternatively, coolant and/or air temperatures may be tracked based on data stored in a multi-input look-up table wherein inputs may include a vehicle speed, a battery state-of-charge (SOC), a front wheel tire wear, an ambient temperature, and the like. In one example, a speed of the fan 560 may be adjusted in response to one or more of the coolant temperatures and the ambient air temperatures.

In one example, the fan speed may be increased in response to a coolant temperature of one or more of the AC condenser 562, the battery radiator 564, and the electric motor radiator 566 exceeding a threshold coolant temperature. The coolant temperature may be a non-zero, positive number based on a desired operating temperature of one or more of the AC condenser 562, the battery radiator 564, and the electric motor radiator 566. As another example, the fan speed may be reduced in response to a front wheel well ambient air temperature being greater than a threshold air temperature. In one example, the threshold air temperature is a non-zero, positive number based on the threshold coolant temperature. Thus, if the front wheel well ambient air temperature is greater than the desired operating temperature, the fan speed may be reduced or the fan may be deactivated.

The fan 560 may be arranged normal to each of the upper interior edge 552, the lower interior edge 554, the upper outer edge 556, and the lower outer edge 558. The AC condenser 562, the battery radiator 564, and the electric motor radiator 566 may be arranged angled to each of the upper interior edge 552, the lower interior edge 554, the upper outer edge 556, and the lower outer edge 558. By angling the AC condenser 562, the battery radiator 564, and the electric motor radiator 566, a surface area exposed to ambient air flowing through the passage 310 may be increased, which may enhance cooling by air. This may further decrease pump demands of a liquid cooling system of the vehicle.

FIG. 4 illustrates an example 400 of an air flow through the inlet 312 and the mid-section 316 of passage 310. FIG. 5C illustrates the air flow through the mid-section and the outlet 314 of the passage 310. Air flow is illustrated via arrows 402. As shown, air enters the inlet in a first direction opposite the direction of forward vehicle travel 390. Air turns to flow in a second direction angled to the first direction and the direction of forward vehicle travel 390. The air then turns and flows the first direction through the mid-section 316. Upon transitioning from the mid-section 316 to the outlet 314, the air turns to flow in a third direction angled to the first direction and the direction of forward vehicle travel 390. In one example, the third direction is normal to the second direction. The air may then turn and flow through the outlet 314 in a fourth direction normal to each of the first direction, the second direction, the third direction, and the direction of forward vehicle travel.

An embodiment of a system for a vehicle, comprises a passage comprising an inlet at a downstream portion of a front wheel well of the vehicle and an outlet upstream of a rear wheel well of the vehicle. A first example of the system further includes where a fan arranged proximally to the inlet. A second example of the system, optionally including the first example, further includes where an air conditioning heat exchanger arranged downstream of the fan. A third example of the system, optionally including one or more of the previous examples, further includes where a battery heat exchanger arranged downstream of the fan. A fourth example of the system, optionally including one or more of the previous examples, further includes where an electric motor heat exchanger arranged downstream of the fan. A fifth example of the system, optionally including one or more of the previous examples, further includes where the inlet is configured to receive air in a first direction, and wherein the outlet is configured to expel air in a second direction, wherein the second direction is normal to the first. A sixth example of the system, optionally including one or more of the previous examples, further includes where a cross-sectional area of the passage is smaller at a mid-portion than at the inlet and the outlet.

An embodiment of a system for an electric vehicle, comprises a passage extending from a front wheel well toward a rear wheel well, wherein the passage comprises a fan arranged upstream of one or more heat exchangers between an inlet and an outlet of the passage. A first example of the system further includes where the inlet is arranged at the front wheel well, wherein a cross-sectional area of the passage decreases from the inlet to a mid-portion, wherein the fan and the one or more heat exchangers are arranged along the mid-portion. A second example of the system, optionally including the first example, further includes where the outlet is arranged at the rear wheel well, wherein the cross-sectional area of the passage increases from the mid-portion to the outlet. A third example of the system, optionally including one or more of the previous examples, further includes where the one or more heat exchangers include an air conditioning heat exchanger, a battery heat exchanger, and an electric motor heat exchanger. A fourth example of the system, optionally including one or more of the previous examples, further includes where the outlet expels air away from a rear wheel. A fifth example of the system, optionally including one or more of the previous examples, further includes where the inlet receives air in a direction opposite to a direction of vehicle travel. A sixth example of the system, optionally including one or more of the previous examples, further includes where the outlet expels air in a direction normal to the direction of vehicle travel. A seventh example of the system, optionally including one or more of the previous examples, further includes where the inlet is arranged at a portion of the front wheel well with a highest pressure.

An embodiment of a system, comprises a passage configured to reduce pressure in a front wheel well, the passage comprising an inlet arranged at a higher pressure region of the front wheel well, the passage further comprising an outlet arranged proximally to a rear wheel well. A first example of the system further includes where the passage houses a fan upstream of an air conditioning heat exchanger, a battery heat exchanger, and an electric motor heat exchanger. A second example of the system, optionally including the first example, further includes where there are no other inlets or additional outlets other than the inlet and the outlet. A third example of the system, optionally including one or more of the previous examples, further includes where the passage is fluidly coupled to only an ambient atmosphere. A fourth example of the system, optionally including one or more of the previous examples, further includes where the outlet expels air upstream of the rear wheel well relative to a direction of vehicle travel.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an electric vehicle, comprising:
a passage extending from a front wheel well of the electric vehicle toward a rear wheel well of the electric vehicle, the front wheel well and the rear wheel well disposed at opposite ends along the length of the electric vehicle, wherein the passage comprises a fan arranged upstream of one or more heat exchangers between an inlet and an outlet of the passage, wherein the fan is upstream of the one or more heat exchangers in a direction extending from the front wheel well to the rear wheel well along the length of the electric vehicle.

2. The system of claim 1, wherein the inlet is arranged at the front wheel well, wherein a cross-sectional area of the passage decreases from the inlet to a mid-portion, wherein the fan and the one or more heat exchangers are arranged along the mid-portion.

3. The system of claim 2, wherein the outlet is arranged at the rear wheel well, wherein the cross-sectional area of the passage increases from the mid-portion to the outlet.

4. The system of claim 1, wherein the one or more heat exchangers include an air conditioning heat exchanger, a battery heat exchanger, and an electric motor heat exchanger.

5. The system of claim 1, wherein the outlet expels air away from a rear wheel.

6. The system of claim 1, wherein the inlet is configured to receive air in a direction opposite to a forward direction of vehicle travel, wherein the forward direction of vehicle travel is travel in a direction towards the front wheel well.

7. The system of claim 6, wherein the outlet expels air in a direction normal to the forward direction of vehicle travel.

8. The system of claim 1, wherein the inlet is arranged at a portion of the front wheel well with a highest pressure.

* * * * *